United States Patent
Sultana et al.

(10) Patent No.: US 9,863,278 B2
(45) Date of Patent: Jan. 9, 2018

(54) AIR EXHAUST TUBE HOLDER IN A TURBOMACHINE

(71) Applicant: SNECMA, Paris (FR)

(72) Inventors: Patrick Sultana, Moissy Cramayel (FR); Boucif Bensalah, Boulogne-Billancourt (FR); Yannick Durand, Chaumes en Brie (FR); Olivier Renon, Bois le Roi (FR)

(73) Assignee: SNECMA, Paris (FR)

( * ) Notice: Subject to any disclaimer, the term of this patent is extended or adjusted under 35 U.S.C. 154(b) by 268 days.

(21) Appl. No.: 14/441,964

(22) PCT Filed: Nov. 4, 2013

(86) PCT No.: PCT/FR2013/052625
§ 371 (c)(1),
(2) Date: May 11, 2015

(87) PCT Pub. No.: WO2014/072626
PCT Pub. Date: May 15, 2014

(65) Prior Publication Data
US 2015/0300206 A1    Oct. 22, 2015

(30) Foreign Application Priority Data

Nov. 12, 2012  (FR) ...................................... 12 60750

(51) Int. Cl.
*F01D 25/28* (2006.01)
*F01M 13/00* (2006.01)
(Continued)

(52) U.S. Cl.
CPC ............... *F01D 25/28* (2013.01); *F01D 9/02* (2013.01); *F01M 13/00* (2013.01); *F16B 2/243* (2013.01); *F16L 3/1222* (2013.01)

(58) Field of Classification Search
CPC ... F01D 25/28; F01D 9/02; F02C 7/20; F01M 13/00; F16B 2/243; F16L 3/1222;
(Continued)

(56) References Cited

U.S. PATENT DOCUMENTS

2004/0088989 A1   5/2004  Dowman
2009/0282679 A1  11/2009  Mons et al.
(Continued)

FOREIGN PATENT DOCUMENTS

| | | |
|---|---|---|
| CH | 702 182 | 5/2011 |
| EP | 2 085 574 | 8/2009 |
| EP | 2 395 214 | 12/2011 |

OTHER PUBLICATIONS

U.S. Appl. No. 14/441,947, filed May 11, 2015, Sultana, et al.
International Search Report dated May 22, 2014 in PCT/FR13/052625 filed Nov. 4, 2013.

*Primary Examiner* — Dwayne J White
*Assistant Examiner* — Peter T Hrubiec
(74) *Attorney, Agent, or Firm* — Oblon, McClelland, Maier & Neustadt, L.L.P.

(57) ABSTRACT

A support for carrying a tube for discharging oil-laden air from a turbine engine, the support including a radially inner annular portion for mounting around the tube, and fins that are inclined relative to the axial direction of the annular portion and relative to the radial plane, the radially outer periphery of each fin being for fastening to an exhaust cone of the turbine engine.

7 Claims, 5 Drawing Sheets

(51) Int. Cl.
  *F01D 9/02* (2006.01)
  *F16B 2/24* (2006.01)
  *F16L 3/12* (2006.01)

(58) Field of Classification Search
  CPC ....... F16L 3/233; F16L 3/08; F05D 2260/602; F05D 2260/605; F05D 2260/608; F05D 2260/609
  USPC .......................................... 415/169.1, 169.2
  See application file for complete search history.

(56) References Cited

U.S. PATENT DOCUMENTS

2011/0302929 A1  12/2011  Brühwiler
2013/0189088 A1* 7/2013  Nanda ..................... F01D 25/30
                                                    415/177

* cited by examiner

AIR EXHAUST TUBE HOLDER IN A TURBOMACHINE

The present invention relates to a support for a tube for discharging oil-laden air from a turbine engine.

In conventional manner, a turbine engine, such as a turboprop or a turbojet, comprises from upstream to downstream in the gas flow direction: a fan; a low pressure compressor; a high pressure compressor; a combustion chamber; a high pressure turbine; a low pressure turbine; and a gas exhaust nozzle. Each compressor stage corresponds to a turbine stage, with the two stages being connected together by a shaft so as to form a spool, in particular a low pressure spool and a high pressure spool.

The shaft of the low pressure spool may be hollow and may contain a tube that is commonly referred to as the center vent tube (CVT). This tube has an upstream portion that is movable in rotation and that is extended by a downstream portion that does not rotate and that serves to discharge oil-laden air coming from certain enclosures in the turbine engine.

The downstream portion of the tube passes through an exhaust cone to which it is connected by a support comprising an inner annular portion of generally omega-shaped section that surrounds the tube, and a conical portion that is fastened to the exhaust cone and to the inner annular portion. The conical portion has holes for passing a flow of cooling air that passes through the exhaust cone. In addition, the conical portion of the support is fastened to the inner annular portion by means of screws.

The exhaust cone is subjected to temperatures lying in the range 650° C. to 680° C., while the tube may be at a temperature lying in the range 450° C. to 480° C. This large temperature difference (240° C.) gives rise to thermal expansion phenomena, to stresses, and to movements, that the support must be capable of absorbing while conserving its stiffness qualities.

In order to achieve such a compromise, the prior art support is relatively heavy, thereby increasing the total weight of the turbine engine, and in addition it is expensive.

A particular object of the present invention is to provide a solution to this problem that is simple, effective, and inexpensive.

To this end, the invention provides a support for carrying a tube for discharging oil-laden air from a turbine engine, the support comprising a radially inner annular portion for mounting around said tube and being characterized in that it includes fins extending outwards from the annular portion, said fins being inclined relative to the axial direction of the annular portion and relative to the radial plane, the radially outer periphery of each fin being for fastening to an exhaust cone of the turbine engine.

Such a support is of relatively small weight, is inexpensive, allows air to pass through the exhaust cone, and appropriately accommodates thermal expansion effects that can occur in operation, while performing its function of supporting the tube.

By way of comparison, such a support weighs about one-fifth to one-sixth the weight of the prior art support.

According to a characteristic of the invention, the inner annular portion comprises a cylindrical inner ring from which a frustoconical annular cup extends radially outwards, each fin extending outwards in line with said cup.

Preferably, the length of the cylindrical inner ring is less than or equal to 0.4 times its inside diameter.

In this way, the cylindrical inner ring provides short guidance acting, to some extent, like a ball-joint connection between the tube and the support.

According to another characteristic of the invention, each fin has an inner periphery connected to the annular portion and an outer periphery including a fastener zone for fastening to the exhaust cone and forming an angle relative to the remainder of the fin.

Advantageously, each fastener zone is in the form of a portion of a cone, complementary to the exhaust cone.

In addition, the fins and the inner annular portion may be made of a nickel-based superalloy, e.g. out of Inconel 625 or out of Inconel 718.

By way of example, the number of fins lies in the range three to 14.

The invention also provides an assembly for a turbine engine having a tube for discharging oil-laden air from a turbine engine, said tube comprising an upstream portion that is movable in rotation and a downstream portion that does not rotate, said downstream portion passing through an exhaust cone and extending along the axis of said exhaust cone, said downstream portion being surrounded by the inner annular portion of a support of the above-specified type so that said downstream portion is mounted to be free to move axially in translation and in rotation in said inner annular portion, the fins of the support also being fastened to the exhaust cone via their outer peripheries.

In an embodiment of the invention, the exhaust cone includes at least one annular stiffener, the outer periphery of each fin being fastened to the stiffener.

Finally, the invention also provides a turbine engine, characterized in that it includes an assembly as described above.

The invention can be better understood and other details, characteristics, and advantages of the invention appear on reading the following description made by way of non-limiting example and with reference to the accompanying drawings, in which.

Figure 1:
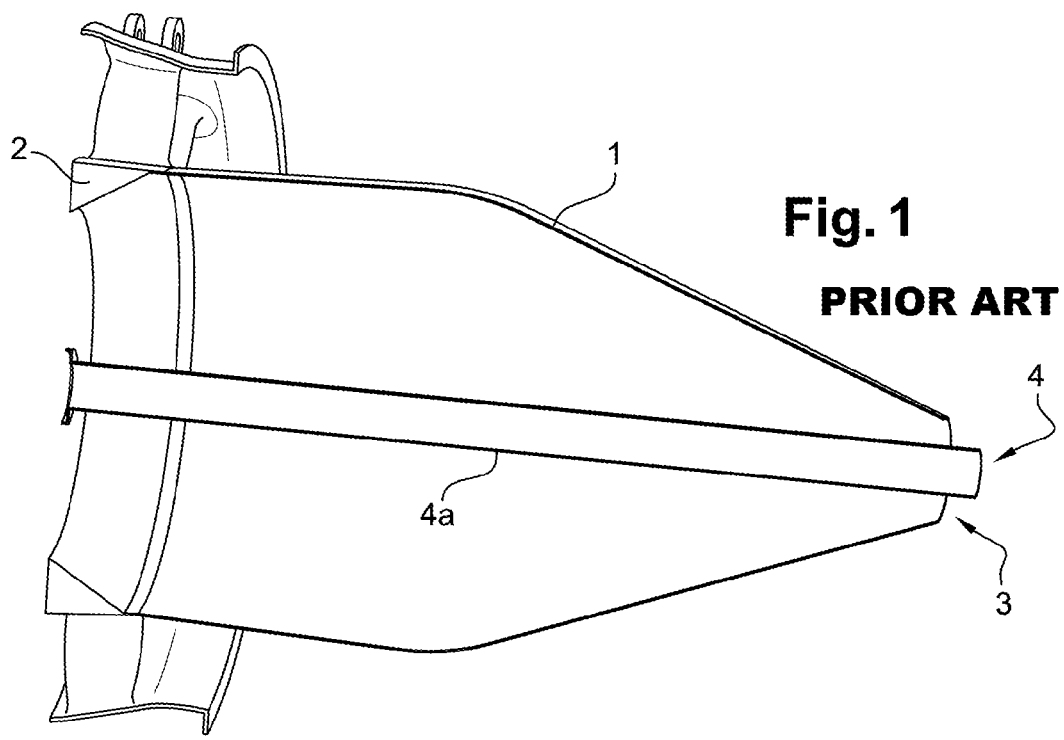
FIG. 1 is a perspective view in axial section of a portion of a prior art turbine engine.

A downstream portion of a prior art turbine engine is shown in FIG. 1 and comprises an exhaust cone 1 fastened downstream from an exhaust casing 2, itself situated downstream from a low pressure turbine (not shown). The exhaust cone 1 has an axial opening 3 at its downstream end.

The turbine engine also has a tube 4 commonly referred to as a center vent tube (CVT) that has an upstream portion that is movable in rotation (not shown) and that is extended by a non-rotary downstream portion 4a for the purpose of discharging oil-laden air coming from certain enclosures within the turbine engine.

Figure 2:
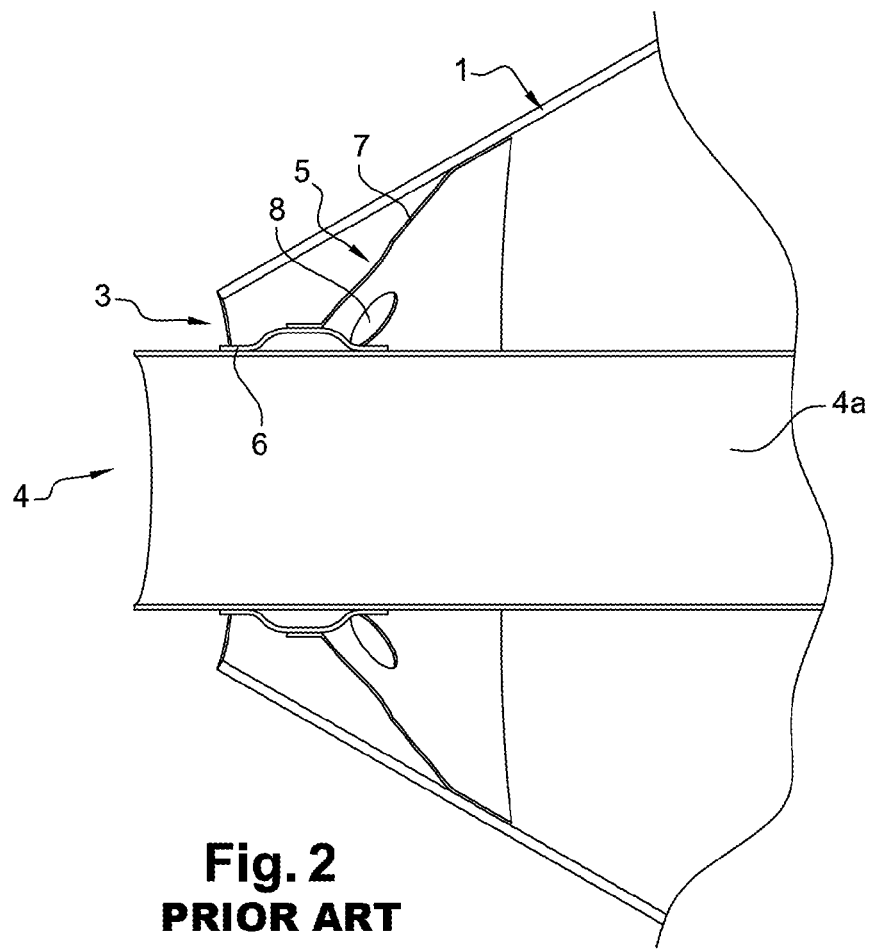
FIG. 2 is an axial section view showing how a prior art support is mounted between an exhaust cone and a tube for discharging oil-laden air.
Figure 3:
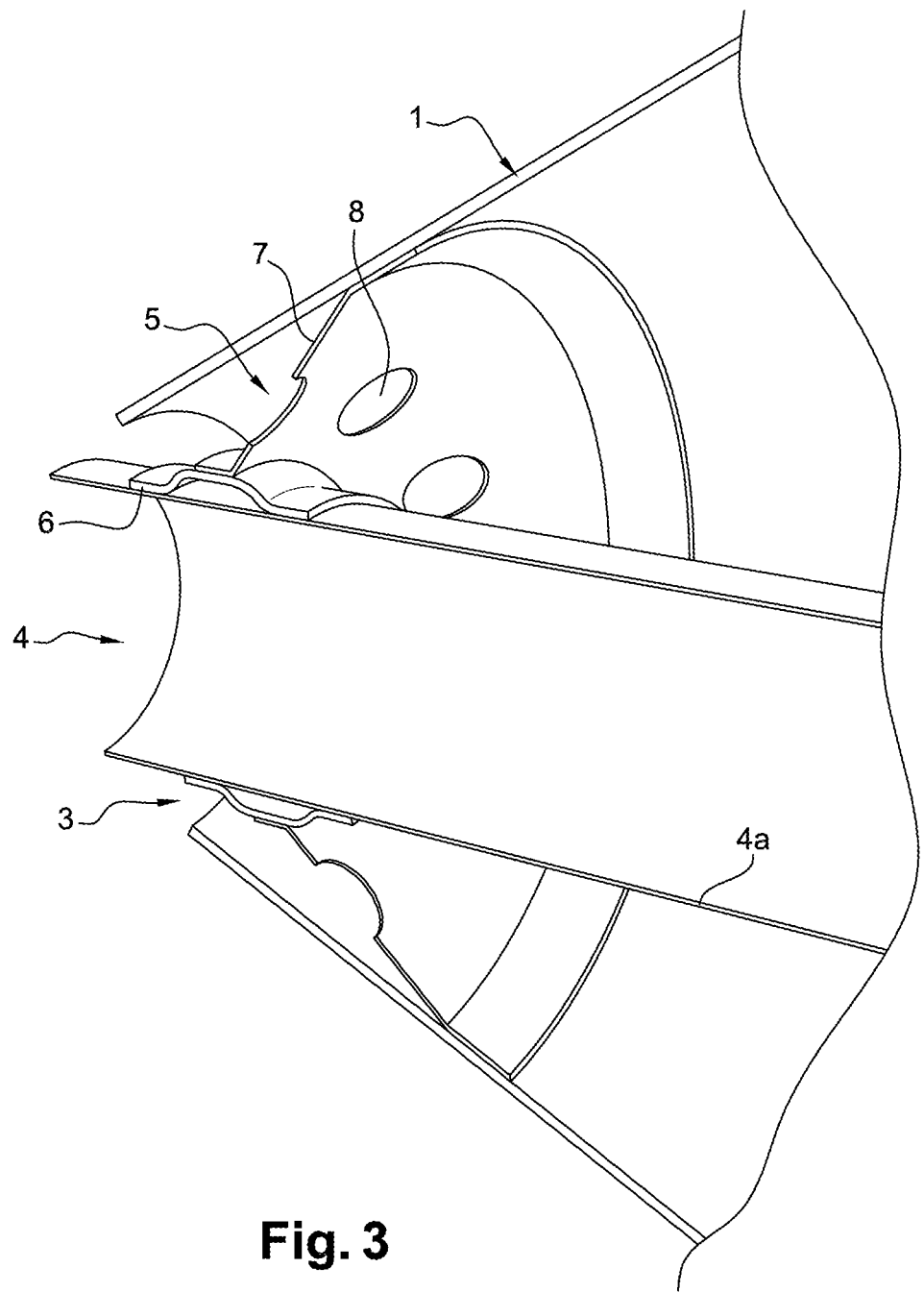
FIG. 3 is a perspective view of the FIG. 2 mounting.
Figure 4:
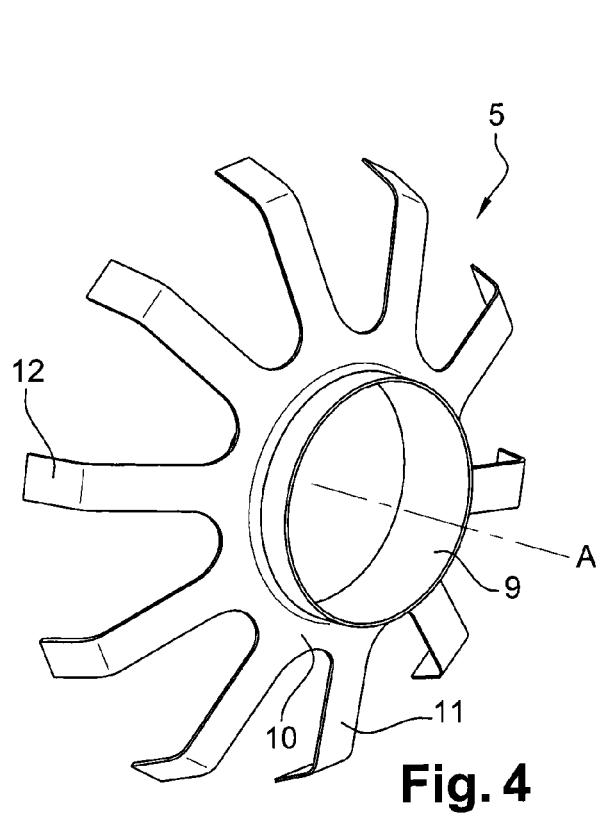
FIG. 4 is a perspective view of a support in a first embodiment of the invention.
Figure 5:
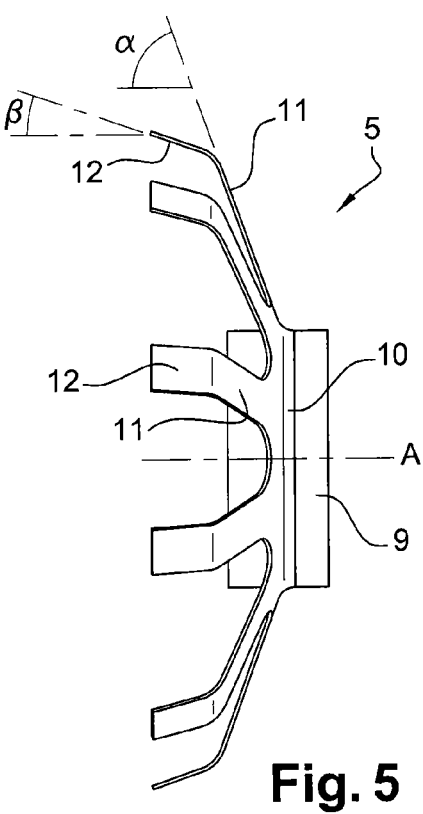
FIG. 5 is a side view of the FIG. 4 support.

The downstream portion 4a of the tube 4 passes through the exhaust cone 1 and opens out downstream therefrom by passing through the opening 3. Said downstream portion 4a is connected to the exhaust cone 1 by a support 5. This support is visible in FIG. 2 and comprises an inner annular portion 6 of generally omega-shaped section surrounding the tube 4, and a conical portion 7 fastened to the exhaust cone 1 and to the inner annular portion 6. The conical portion 7 has holes 8 for passing a flow of cooling air passing through the exhaust cone 1. In addition, the conical portion 7 of the support 5 is fastened to the inner annular portion 6 via screws (not shown).

As explained above, such a support 5 is relatively heavy and expensive.

In order to remedy those drawbacks, the invention proposes connecting the downstream portion 4a of the tube 4 to the exhaust cone 1 by the support 5 as shown in FIGS. 4 to 8. This support 5 is made by assembling together a cylindrical ring 9 for mounting around said tube 4 and a frustoconical cup 10 from which there extend fins 11. The length of the cylindrical ring 9 is less than or equal to 0.4 times its inside diameter. In this way, the cylindrical ring 9 forms a short guide that constitutes, to some extent, a ball-joint connection between the tube 4 and the support 5. The frustoconical cup 10 is fastened in the middle zone of the cylindrical ring 9. The tube 4 is also mounted to be free to move in rotation and in axial translation in the ring 9. These various degrees of freedom serve in particular to compensate for any deformation in operation, e.g. due to mechanical and thermal stresses. The ring 9 may also have chamfers facing radially inwards at its ends so as to avoid damaging the tube 4 while the support 5 is being mounted.

Figure 6:
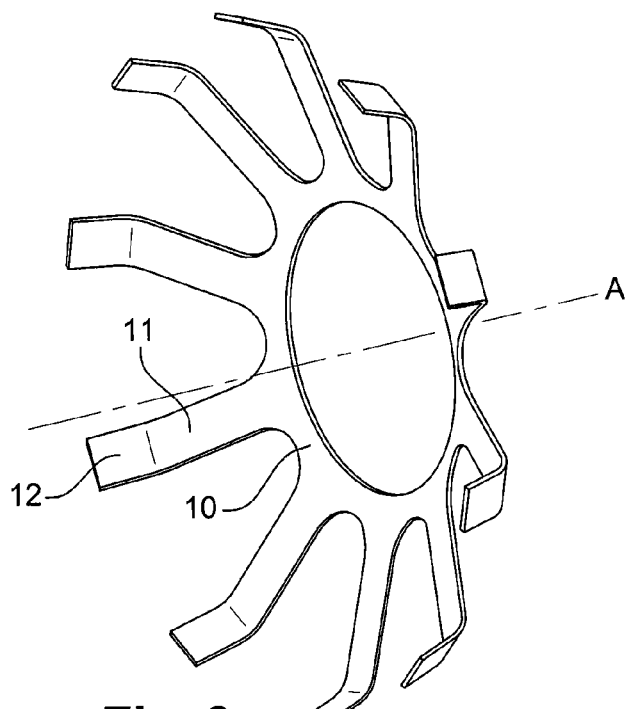
FIG. 6 is a perspective view of the frustoconical cup and the fins of the FIG. 4 support.
Figure 7:
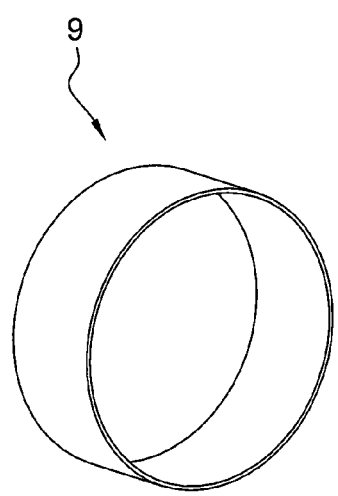
FIG. 7 is a perspective view of the cylindrical ring of the FIG. 4 support.
Figure 8:
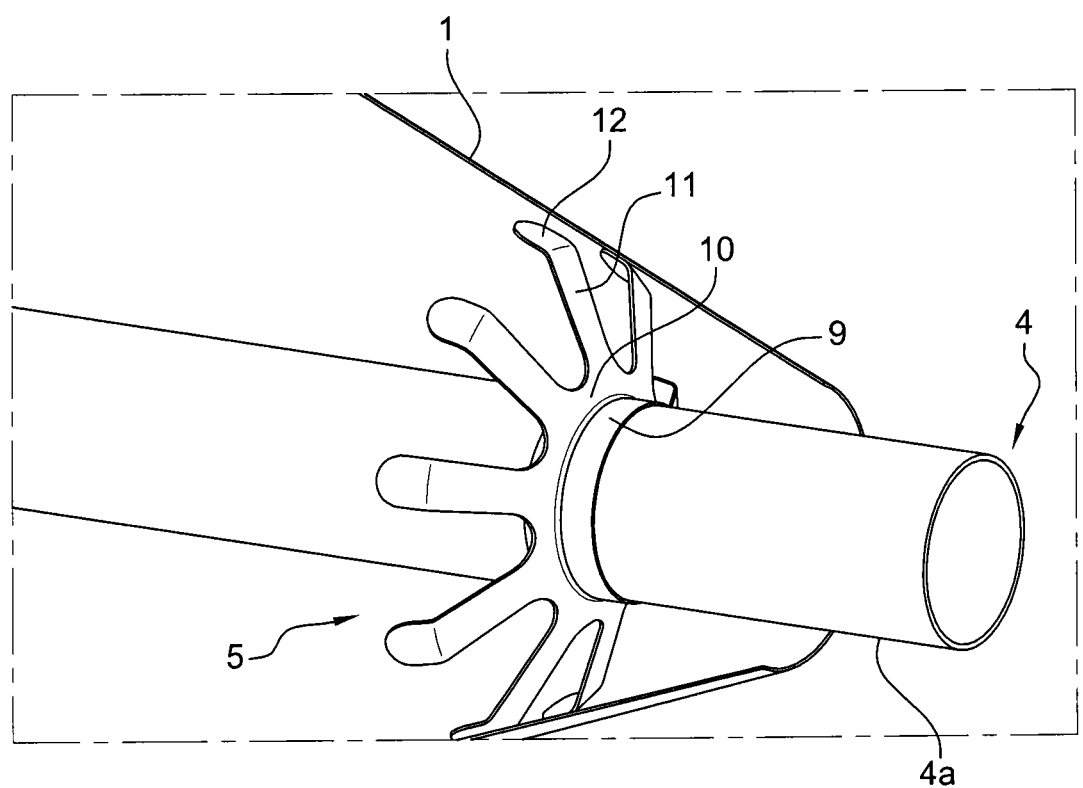
FIG. 8 is a partially cutaway perspective view of a portion of a turbine engine including the FIG. 4 support.

The assembly shown in FIG. 6, constituting the frustoconical cup 10 together with the fins 11, may be obtained by cutting and folding sheet metal, which is then fastened, e.g. by brazing, to the cylindrical inner ring 9 shown in FIG. 7.

Each fin 11 extends outwards in line with the cup 10 and has an inner peripheral portion that is connected to the cup 10 and also an outer peripheral portion with a fastener zone 12 for fastening to the exhaust cone 1, the fastener zone 12 forming an angle β with the remainder of the fin 11. Each fastener zone 12 is preferably in the form of a portion of a cone and it is complementary to the inside surface of the exhaust cone 1. The number of fins 11 may lie in the range three to 14, for example.

The angle α of the cup 10 and of the fins 11 relative to the axis A of the support 5 is not a right angle. The angle of inclination a of the fins 11 makes it possible to accommodate appropriately the effects of thermal expansion that can occur in operation, while also serving to support the tube 4.

The fins 11, the frustoconical cup 10, and the cylindrical ring 9 are made of a nickel-based superalloy, e.g. out of Inconel 625 (NiCr22Mo9Nb) or out of Inconel 718.

Such a support 5 is relatively lightweight, it allows cooling air to pass between the various fins 11, and it is inexpensive. By way of comparison, such a support 5 weighs one-fifth to one-sixth the weight of the prior art support shown in FIG. 2.

Figure 9:
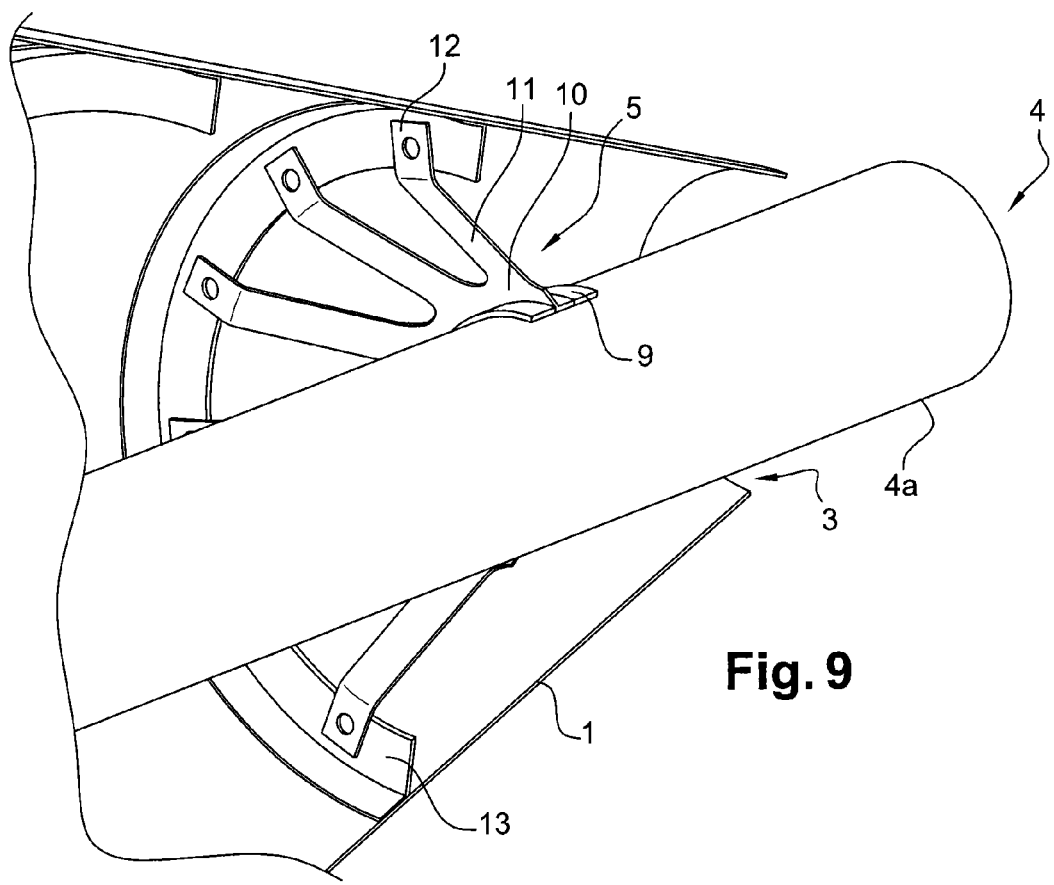
FIG. 9 is a partially cutaway perspective view of a portion of a turbine engine including a support in a second embodiment of the invention.
Figure 10:
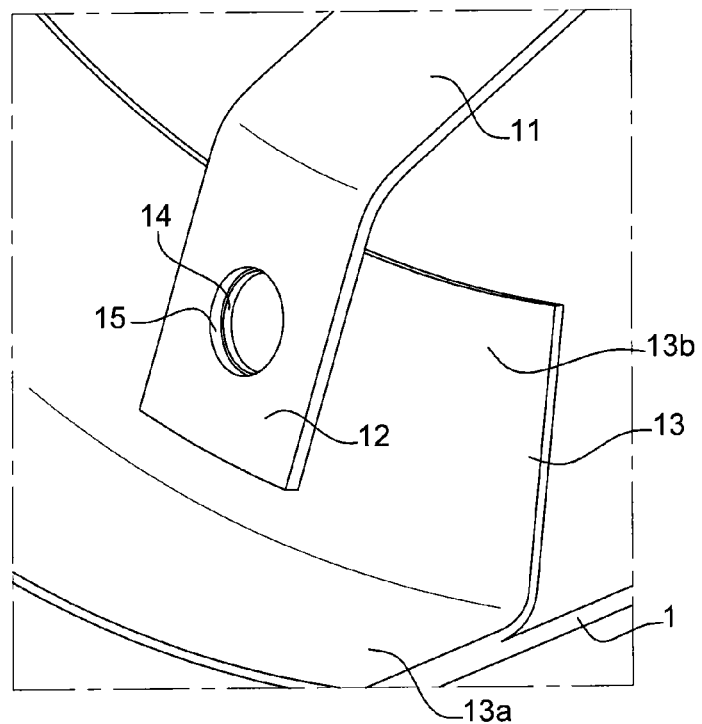
FIG. 10 is a detail view of a portion of FIG. 9.

FIGS. 9 and 10 show a variant embodiment of the invention in which the inside wall of the exhaust cone 1 has annular stiffeners extending radially inwards. Each stiffener presents an L-shaped section, with one branch 13a fastened to the inside wall of the cone 1, e.g. by welding, and another branch 13b that includes holes 14 (FIG. 10).

As above, the support 5 is made by assembling a cylindrical ring 9 for mounting around said tube 4 and a frustoconical cup 10 from which there extend fins 11. The support 5 in FIGS. 9 and 10 differs from that shown in FIGS. 4 to 8 in that the radially outer periphery of each fin has a fastener zone 12 that is parallel to the flange 13b of the stiffener situated furthest downstream and is pressed against the upstream wall of this flange 13b. Each fastener zone 12 includes a hole 15 that faces a corresponding hole 14.

These holes 14 and 15 serve to pass screws for fastening the support 5 to the stiffener 13, e.g. co-operating with nuts that are riveted in the holes 15 in the fins 11 of the support 5, or in the holes 14 of the stiffener 13.

The invention claimed is:

1. A support for carrying a tube for discharging oil-laden air from a turbine engine, the support comprising a radially inner annular portion for mounting around said tube and comprises fins extending outwards from the annular portion, said fins being inclined relative to the axial direction of the annular portion and relative to the radial plane, the radially outer periphery of each fin being for fastening to an exhaust cone of the turbine engine, wherein the inner annular portion comprises a cylindrical inner ring from which a frustoconical annular cup extends radially outwards, each fin extending outwards in line with said cup, and wherein the length of the cylindrical inner ring is less than or equal to 0.4 times its inside diameter.

2. The support according to claim 1, wherein the fins and the inner annular portion are made of a nickel-based superalloy.

3. The support according to claim 1, wherein the number of fins lies in the range three to 14.

4. A support for carrying a tube for discharging oil-laden air from a turbine engine, the support comprising a radially inner annular portion for mounting around said tube and comprises fins extending outwards from the annular portion, said fins being inclined relative to the axial direction of the annular portion and relative to the radial plane, the radially outer periphery of each fin being for fastening to an exhaust cone of the turbine engine, wherein each fin has an inner periphery connected to the annular portion and an outer periphery including a fastener zone for fastening to the exhaust cone and forming an angle relative to the remainder of the fin, and wherein each fastener zone is in the form of a portion of a cone.

5. An assembly for a turbine engine having a tube for discharging oil-laden air from a turbine engine, said tube comprising an upstream portion that is movable in rotation and a downstream portion that does not rotate, said downstream portion passing through an exhaust cone and extending along the axis of said exhaust cone, said downstream portion being surrounded by an inner annular portion of a support so that said downstream portion is mounted to be free to move axially in translation and in rotation in said inner annular portion, wherein said support comprises said radially inner annular portion for mounting around said tube and comprises fins extending outwards from the annular portion, said fins being inclined relative to the axial direction of the annular portion and relative to the radial plane, the radially outer periphery of each fin being for fastening to an exhaust cone of the turbine engine.

6. The assembly according to claim 5, wherein the exhaust cone includes at least one annular stiffener, the outer periphery of each fin being fastened to the stiffener.

7. A turbine engine comprising the assembly according to claim 5.

\* \* \* \* \*